US009600745B2

(12) United States Patent
Sakurai

(10) Patent No.: US 9,600,745 B2
(45) Date of Patent: Mar. 21, 2017

(54) IMAGE RECOGNITION SYSTEM, IMAGE RECOGNITION METHOD, AND NON-TRANSITORY COMPUTER READABLE MEDIUM STORING IMAGE RECOGNITION PROGRAM

(75) Inventor: Kazuyuki Sakurai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 540 days.

(21) Appl. No.: 14/005,228

(22) PCT Filed: Nov. 16, 2011

(86) PCT No.: PCT/JP2011/006377
§ 371 (c)(1),
(2), (4) Date: Sep. 13, 2013

(87) PCT Pub. No.: WO2012/124000
PCT Pub. Date: Sep. 20, 2012

(65) Prior Publication Data
US 2014/0010410 A1 Jan. 9, 2014

(30) Foreign Application Priority Data
Mar. 17, 2011 (JP) .................................. 2011-059356

(51) Int. Cl.
G06K 9/62 (2006.01)
G06K 9/00 (2006.01)
G06K 9/46 (2006.01)

(52) U.S. Cl.
CPC ....... *G06K 9/6267* (2013.01); *G06K 9/00362* (2013.01); *G06K 9/4642* (2013.01)

(58) Field of Classification Search
None
See application file for complete search history.

(56) References Cited

U.S. PATENT DOCUMENTS 6,421,463 B1* 7/2002 Poggio ............... G06K 9/00228
382/224
6,647,139 B1* 11/2003 Kunii ................. G06K 9/00791
382/159
(Continued)

FOREIGN PATENT DOCUMENTS

JP 11-306354 A 11/1999
JP 11306354 A * 11/1999
(Continued)

OTHER PUBLICATIONS

Paul Viola, et al., "Multiple Instance Boosting for Object Detection", Proc. Conference on Advances in Neural Information Processing Systems 18, 2006.
(Continued)

*Primary Examiner* — Tsung-Yin Tsai
(74) *Attorney, Agent, or Firm* — McGinn IP Law Group, PLLC.

(57) ABSTRACT

An image recognition system includes a partial area determination unit for determining a plurality of learning partial areas in a learning image including an object to be recognized, a partial area set generation unit for generating a learning partial area set including the learning partial area and a plurality of peripheral areas included in a predetermined range with reference to the learning partial area, and a learning unit for selecting an area including an image suitable to be determined as an object to be identified included the object to be recognized from a plurality of areas included in the learning partial area set, to learn a classifier so as to determine a likelihood that the image included in the area is the object to be identified to be higher based on a feature amount related to the selected area.

20 Claims, 12 Drawing Sheets

(56) References Cited

U.S. PATENT DOCUMENTS

| | | | |
|---|---|---|---|
| 2003/0161504 A1* | 8/2003 | Inoue | G06K 9/00221 382/115 |
| 2009/0232403 A1* | 9/2009 | Waragai | G06K 9/00228 382/209 |
| 2009/0245626 A1* | 10/2009 | Norimatsu | G06K 9/4628 382/164 |
| 2010/0014755 A1* | 1/2010 | Wilson | G06K 9/00604 382/173 |
| 2010/0103286 A1* | 4/2010 | Akiyama | G03B 7/28 348/231.6 |
| 2011/0103694 A1* | 5/2011 | Nakano | G06K 9/00281 382/190 |

FOREIGN PATENT DOCUMENTS

| | | | |
|---|---|---|---|
| JP | 2002-032751 A | 1/2002 | |
| JP | 2006-293528 A | 10/2006 | |
| JP | WO 2007091714 A1 * | 8/2007 | G06K 9/00281 |
| JP | 2007-310805 A | 11/2007 | |
| JP | 2008-217589 A | 9/2008 | |
| JP | 2010-204826 A | 9/2010 | |

OTHER PUBLICATIONS

P. Viola, et al., "Rapid Object Detection using a Boosted Cascade of Simple Features", Proc. IEEE Conf. on Computer Vision and Pattern Recognition, vol. 1, Dec. 2001.

N. Dalai, et al., "Histograms of Oriented Gradients for Human Detection", IEEE Proc. CVPR2005, 2005.

Subhransu Maji, et al., "Object Detection using a Max-Margin Hough Transform", IEEE Proc. CVPR2009, pp. 1038-1045, 2009.

International Search Report dated Dec. 13, 2011 with English translation thereof.

Japanese Office Action dated Oct. 6, 2015 with an English translation.

Anuj Mohan, et al. "Example-Based Object Detection in Images by Components", IEEE Transactions on Pattern Analysis and Machine Intelligence, IEEE, Apr. 2001, vol. 23, No. 4.

* cited by examiner

IMAGE RECOGNITION SYSTEM, IMAGE RECOGNITION METHOD, AND NON-TRANSITORY COMPUTER READABLE MEDIUM STORING IMAGE RECOGNITION PROGRAM

TECHNICAL FIELD

The present invention relates to an image recognition system, an image recognition method, and a non-transitory computer readable medium storing an image recognition program, and relates to an image recognition system, an image recognition method, and a non-transitory computer readable medium storing an image recognition program capable of recognizing an object in an image with high recognition accuracy.

BACKGROUND ART

One example of a learning apparatus is disclosed in Patent literature 1. As shown in FIG. 14, this learning apparatus includes a storage device 1000, a feature point detection unit 1001, a feature amount calculation unit 1002, a vote learning unit 1003, and a classifier learning unit 1004. This learning apparatus has such a feature that, since the learning apparatus identifies an object by voting of feature points, it is relatively robust regarding the difference in shape or the like of each recognition target.

The learning apparatus having such a configuration operates as follows.

The storage device 1000 stores learning images consisting of an image group related to recognition target object and an image group of objects other than the recognition target object. The feature point detection unit 1001 detects a number of feature points from the respective learning images. The feature amount calculation unit 1002 calculates a feature vector as a feature amount related to the feature points and a peripheral image area. The vote learning unit 1003 calculates and stores voting positional information in a parameter space as a voting space for the feature point corresponding to the feature vector calculated from the image related to the recognition target object of the learning image. The classifier learning unit 1004 learns the classifier configured to discriminate whether a given feature point detected in recognition of the recognition target object belongs to the recognition target object using the feature vector.

Patent literature 2 discloses a learning apparatus aimed at improving an identifying performance. The learning apparatus calculates, for each point on a sample image, local information required to recognize a pattern using a rectangular window set around the point. Further, the learning apparatus calculates, for each point on the sample image, arrangement information that specifies identifying classes of areas in the periphery of the marked point. Then the learning apparatus selects one combined information from a plurality of combined information being generated by combining the local information and the arrangement information, to calculate an identifying parameter for one weak classifier based on the combined information that is selected.

Non-patent literatures 1-4 also disclose techniques related to image recognition.

CITATION LIST

Patent Literature

Patent literature 1: Japanese Unexamined Patent Application Publication No. 2010-204826

Patent literature 2: Japanese Unexamined Patent Application Publication No. 2008-217589

Non Patent Literature

Non-patent literature 1: Paul Viola, John C. Platt and Cha Zhang, "Multiple Instance Boosting For Object Detection", Proc. Conference on Advances in Neural Information Processing Systems 18, pp. 1419-1426, 2006.

Non-patent literature 2: P. Viola, M. Jones, "Rapid Object Detection using a Boosted Cascade of Simple Features", Proc. IEEE Conf. on Computer Vision and Pattern Recognition, Vol. 1, pp. 511-518, December 2001.

Non-patent literature 3: N. Dalal and B. Triggs: "Histograms of Oriented Gradients for Human Detection", IEEE Proc. CVPR2005, pp. 829-836, 2005.

Non-patent literature 4: Subhransu Maji, Jitendra Malik: "Object Detection using a Max-Margin Hough Transform", IEEE Proc. CVPR2009, pp. 1038-1045, 2009.

SUMMARY OF INVENTION

Technical Problem

The technique disclosed in Patent literature 1 described above has a problem that it is impossible to accurately recognize an object to be recognized formed of a curved line (e.g., a person). The reason for it is that, if the object to be recognized is an object formed of a curved line (e.g., a person), it is difficult to accurately detect the feature points. More specifically, detection of the feature points used in the technique disclosed in Patent literature 1 is to detect corner points, blobs and the like; however, an object such as a person or the like having a contour line whose curvature changes rather smoothly rarely has such features.

As stated above, Patent literature 2 discloses a technique aimed at improving the identifying performance. However, the technique disclosed in Patent literature 2 does not disclose a technique of learning a classifier based on an area selected from a partial area set, which is different from the present invention.

The present invention has been made in order to solve the aforementioned problems, and aims to provide an image recognition system, an image recognition method, and a non-transitory computer readable medium storing an image recognition program which are capable of robustly recognizing even an object to be recognized including a curved line.

Solution to Problem

An image recognition system according to a first exemplary aspect of the present invention includes: image recognition means for recognizing an object to be recognized included in an input image based on a result of determination by a classifier, the classifier determining a likelihood that an image included in an arbitrary area in the input image including the object to be recognized having an object to be identified is the object to be identified based on a feature amount regarding the area; partial area determination means for determining a plurality of learning partial areas in a learning image including the object to be recognized; partial area set generation means for generating a learning partial area set based on the learning partial area, the learning partial area set including the learning partial area and a plurality of peripheral areas included in a predetermined range with reference to the learning partial area; and learning means for selecting, when performing learning of the classifier for the learning partial area, an area including an image suitable to be determined as the object to be identified from a plurality of areas included in the learning partial area set generated by the learning partial area, to learn the classifier so as to determine the likelihood that the image included in the area is the object to be identified to be higher based on a feature amount related to the selected area.

An image recognition method according to a second exemplary aspect of the present invention includes: determining a plurality of learning partial areas in a learning image including an object to be recognized having an object to be identified; generating a learning partial area set based on the learning partial area, the learning partial area set including the learning partial area and a plurality of peripheral areas included in a predetermined range with reference to the learning partial area; when performing learning of a classifier that identifies a likelihood that an image included in an arbitrary area in an input image including the object to be recognized is the object to be identified based on a feature amount regarding the area for the learning partial area, selecting an area including an image suitable to be determined as the object to be identified from a plurality of areas included in the learning partial area set generated by the learning partial area, to learn the identifier so as to determine the likelihood that the image included in the area is the object to be identified to be higher based on a feature amount related to the selected area; and recognizing the object to be recognized included in the input image based on a result of determining the input image by the classifier.

A non-transitory computer readable medium storing an image recognition program according to a third exemplary aspect of the present invention causes a computer to execute the following processing of: determining a plurality of learning partial areas in a learning image including an object to be recognized having an object to be identified; generating a learning partial area set based on the learning partial area, the learning partial area set including the learning partial area and a plurality of peripheral areas included in a predetermined range with reference to the learning partial area; when performing learning of a classifier that identifies a likelihood that an image included in an arbitrary area in an input image including the object to be recognized is the object to be identified based on a feature amount regarding the area for the learning partial area, selecting an area including an image suitable to be determined as the object to be identified from a plurality of areas included in the learning partial area set generated by the learning partial area, to learn the identifier so as to determine the likelihood that the image included in the area is the object to be identified to be higher based on a feature amount related to the selected area; and recognizing the object to be recognized included in the input image based on a result of determining the input image by the classifier.

Advantageous Effects of Invention

According to each exemplary aspect of the present invention stated above, it is possible to provide an image recognition system, an image recognition method, and a non-transitory computer readable medium storing an image recognition program which are capable of robustly recognizing even an object to be recognized including a curved line.

DESCRIPTION OF EMBODIMENTS

Figure 1:
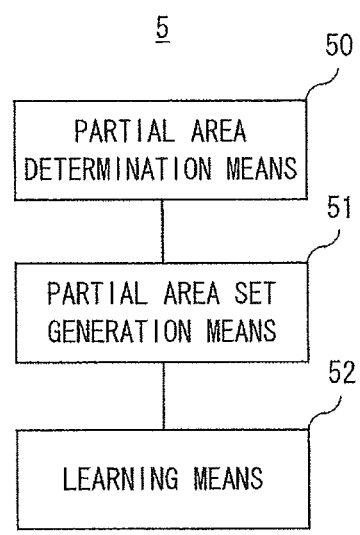
FIG. 1 is a block diagram showing a schematic configuration of an image recognition system according to an exemplary embodiment of the present invention.

First, with reference to FIG. 1, the outline of an image recognition system 5 according to an exemplary embodiment of the present invention will be described. FIG. 1 is a block diagram showing a schematic configuration of the image recognition system 5 according to the exemplary embodiment of the present invention.

The image recognition system 5 includes a partial area determination means 50, a partial area set generation means 51, and a learning means 52. The image recognition system 5 recognizes an object to be recognized included in an input image based on a result of determination by a classifier. The input image includes the object to be recognized having an object to be identified. The classifier determines a likelihood that an image included in an arbitrary area in the input image is the object to be identified based on a feature amount regarding the area.

The partial area determination means 50 determines a plurality of learning partial areas in a learning image including the object to be recognized.

The partial area set generation means 51 generates a learning partial area set including the learning partial area and a plurality of peripheral areas included in a predetermined range with reference to the learning partial area based on the learning partial area.

The learning means 52 selects an area including an image suitable to be determined as the object to be identified from a plurality of areas included in the learning partial area set, and learns the classifier so as to determine the likelihood that the image included in the area is the object to be identified to be higher based on a feature amount related to the selected area.

Subsequently, an operation of the image recognition system 5 according to the exemplary embodiment of the present invention will be described.

The partial area determination means 50 determines a plurality of learning partial areas in the learning image including the object to be recognized. The partial area set generation means 51 generates a learning partial area set including the learning partial area and a plurality of peripheral areas included in a predetermined range with reference to the learning partial area based on the learning partial area determined by the partial area determination means 50. The learning means 52 selects an area including an image suitable to be determined as the object to be identified from a plurality of areas included in the learning partial area set generated by the partial area set generation means 51. Then, the learning means 52 learns the classifier so as to determine the likelihood that the image included in the area is the object to be identified to be higher based on a feature amount related to the selected area.

Next, with reference to the drawings, an image recognition system 10 according to the exemplary embodiment of the present invention will be described in detail.

Figure 2:
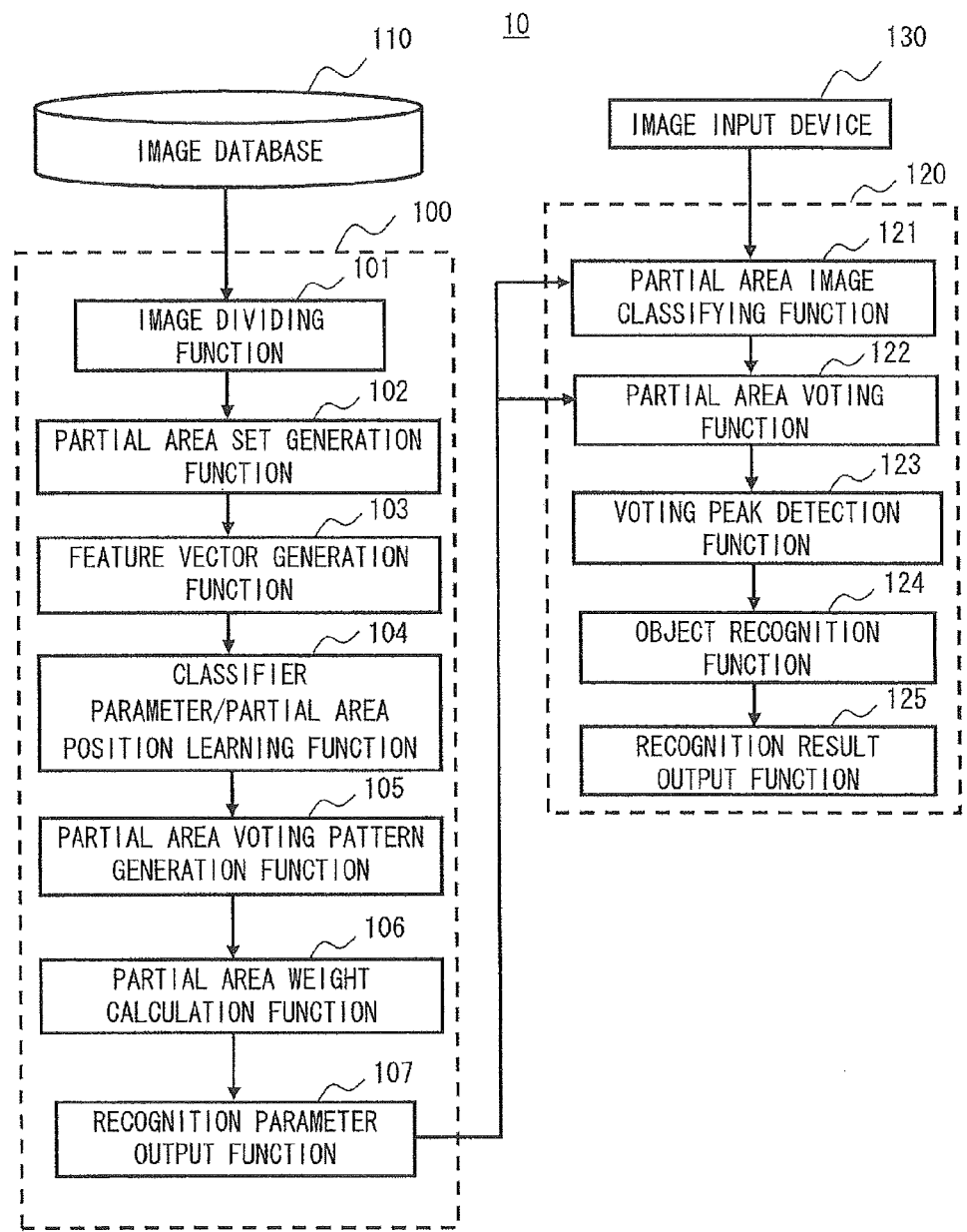
FIG. 2 is a block diagram showing a configuration of the image recognition system according to the exemplary embodiment of the present invention.

Referring to FIG. 2, the image recognition system 10 according to the exemplary embodiment of the present invention includes computers 100 and 120 operated by program control, an image database 110, and an image input device 130. Each of the computers 100 and 120 includes a processor (also referred to as a central processing unit or a data processing unit) (not shown).

The computer 100 includes an image dividing function 101, a partial area set generation function 102, a feature vector generation function 103, a classifier parameter/partial area position learning function 104, a partial area voting pattern generation function 105, a partial area weight calculation function 106, and a recognition parameter output function 107.

The computer 120 includes a partial area image classifying function 121, a partial area voting function 122, a voting peak detection function 123, an object recognition function 124, and a recognition result output function 125.

These means substantially operate as follows.

The image database 110 stores images including the object to be recognized required for the learning of the classifier parameter/partial area position learning function 104. The image database 110 may further store images that do not include the object to be recognized as necessary. The images stored in the image database 110 are learning images for learning a partial area classifier which will be described later. The image database 110 may be, for example, storage means such as a memory, a hard disc drive, or an optical disc drive included in the computer 100, or a computer that includes a storage device storing images and is able to transmit and receive images to and from the computer 100 through any desired communication means.

The object to be recognized means the object to be recognized by the image recognition system in an image. The object to be recognized is, for example, a person. Further, in this exemplary embodiment, any object among the objects included in the object to be recognized is defined as an object to be identified. The object to be identified is, for example, hands, legs, or a head of a person. As will be described later, the image recognition system identifies the object to be identified included in the image. The image recognition system votes a voting pattern corresponding to the kind of the object to be identified that is identified to a voting space corresponding to the kind of the object to be identified that is identified. The image recognition system recognizes the position of the object to be recognized on the basis of the positional relation of the object to be identified based on this voting result.

The image dividing function 101 divides each image in the image database 110 into a plurality of partial areas. The partial area set generation function 102 generates, for each partial area, a partial area set which is a set of a plurality of areas including the partial area and the peripheral areas thereof. The feature vector generation function 103 generates a feature vector from each of the areas in the partial area set.

The classifier parameter/partial area position learning function 104 learns parameters of a partial area classifier using the feature vector based on the framework of Multiple Instance Learning described later. The partial area classifier is a classifier that classifies an area in which the feature vector is generated to a partial area class based on the feature vector. The partial area class defines which object to be identified among the objects to be identified included in the object to be recognized the image included in the area of the identification target corresponds to, or whether the image included in the area of the identification target does not correspond to any object to be recognized. In short, the partial area classifier determines whether the image included in the area in which the feature vector is generated is the object to be identified based on the feature vector. Accordingly, a plurality of partial area classifiers are prepared so as to correspond to the respective objects to be identified, for example. Alternatively, one or a plurality of partial area classifiers are prepared as a classifier that can perform classification into a plurality of objects to be identified.

When learning the partial area classifier that performs classification into a partial area class of an object to be identified, the classifier parameter/partial area position learning function 104 selects the most suitable area as the partial area class from the partial area set and calculates parameters of the partial area classifier using a feature vector of the selected area. The selection of the most suitable area is performed using the technique by Multiple Instance Learning. Further, the classifier parameter/partial area position learning function 104 specifies an area including an image which is most likely to be the object to be identified from the partial area set by the partial area classifier after learning, to calculate a relative position of a recognition reference point of the object to be recognized from the area that is specified. Accordingly, parameters of the partial area classifier corresponding to the partial area class of each object to be identified are learned. Further, the position of the object to be recognized with respect to the object to be identified is learned by the relative position that is calculated, as described later.

The partial area voting pattern generation function 105 generates, based on the relative position of the object to be recognized from the object to be identified that is calculated, the voting pattern for the partial area class of the object to be identified. This voting pattern is generated by overlapping relative positions that are calculated on the voting space with reference to the area specified as an area which is most likely to be the object to be identified. In summary, the point in which the relative positions are overlapped most intensively in the voting pattern is determined to be the most suitable position as the position of the object to be recognized seen from the object to be identified. In this way, the positional relation between the object to be identified and the object to be recognized is learned. The partial area weight calculation function 106 calculates a partial area weight for the partial area class of each object to be identified in order to optimize the identification between the object to be recognized and the rest. The recognition parameter output function 107 outputs each parameter that is learned. More specifically, the recognition parameter output function 107 outputs the learned parameters of the partial area classifier to the partial area image classifying function 121 of the computer 120, and outputs the voting pattern and the partial area weight that are generated to the partial area voting function 122 of the computer 120. The parameters of the partial area classifier, data such as the voting pattern and the partial area weight and the like may be directly output from the computer 100 to the computer 120, as described above, or may be passed from the computer 100 to the computer 120 through any desired external storage medium, as will be described below with reference to FIG. 13.

The image input device 130 supplies an original image to the computer 120. The image input device 130 includes, for example, as will be described with reference to FIG. 13, storage means for storing original images, and is a computer that is able to transmit or receive images to or from the computer 120 by any desired communication means. Hereinafter, the original image that is input is also referred to as an "input image". The computer 120 recognizes the object to be recognized included in the original image by an identifying operation described later.

The partial area image classifying function 121 classifies each partial area of the original image into each partial area class by each partial area classifier. The partial area voting function 122 gives a vote to the voting space based on the partial area weight and the voting pattern with respect to the partial area class for each partial area of the original image. The voting peak detection function 123 detects the peak of the vote in the voting space. The object recognition function 124 specifies the position of the object to be recognized based on the peak of the vote in the voting space, to recognize the object to be recognized. The recognition result output function 125 outputs the recognition result of the object to be recognized.

Now, learning of the position and parameters of a classifier based on the framework of Multiple Instance Learning disclosed in Non-patent literature 1 will be described. The classifier typically outputs a class y to which x is estimated to belong with respect to input data x by a discriminant function f(x; w) defined by a parameter w, as indicated by expression (1). In this example, when the classifier classifies two classes as the class, the classifier outputs 1 when the input data is in the class of the object to be identified, and outputs 0 when the input data is in the class other than the identification target.

$$y=f(x;w) \quad (1)$$

The learning of the parameter w is to determine the parameter w using a learning data set $\{xi, yi\}(i=0, 1, \ldots, Ni)$ which is a set of learning data (xi, yi) whose corresponding class has already been specified. The symbol Ni denotes any positive integer. Further, the symbol xi indicates the input data, and yi indicates a class corresponding to the input data xi. In Multiple Instance Learning, in place of single input data such as the input data xi, an input data group $\{xij\}(j=0, 1, \ldots, Nj)$ which is a set of a plurality of pieces of input data is associated with the class yi in the learning data set. It is assumed that at least one input data in the input data group $\{xij\}$ belongs to the class yi. The symbol Nj is any positive integer. In short, $\{\{xij\}, yi\}$ is used as the learning data set. In this case, the discriminant function with respect to the input data group $\{xij\}$ is defined as shown in expression (2).

$$y=F(\{xij\};w)=\text{softmax}\_j(f(xij;w)) \quad (2)$$

The function softmax_j( ) is a differentiable function that approximates the maximum value regarding the index j, and Non-patent literature 1 discloses some examples. The parameters of the discriminant function F({xij}; w) are learned using a learning data set $\{\{xij\}, yi\}$. In this case, the parameter w is learned so that the discriminant function f(x; w) outputs 1 for the input data xik (k is a positive integer ranging from 0 to Nj) which is most likely to be the object to be identified in each input data group {xij} by expression (2). Since at least one input data of the input data group {xij} belongs to the class of the object to be identified, learning of the parameter w is performed for the input data which belongs to the class of the object to be identified among the input data included in the input data group {xij}.

Figure 3:
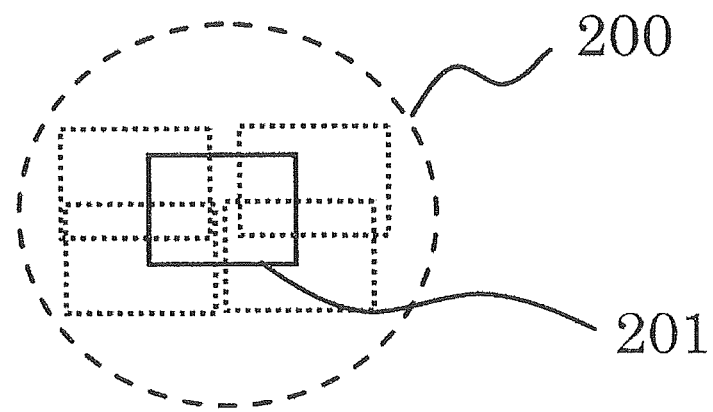
FIG. 3 is a diagram describing search for a partial area from a partial area set.

If it is assumed that the input data xi is a feature vector calculated from the partial area, the feature vector calculated from each area that belongs to the partial area set can be considered as the input data group {xij}. More specifically, in the input data group {xij}, the value of i expresses the partial area set among the plurality of partial area sets, and the value of j expresses the area in a plurality of areas included in the partial area set. In this case, if learning is performed by the framework of Multiple Instance Learning stated here, as shown in FIG. 3, the parameters of the partial area classifier for an area 201 which is most likely to be the object to be identified in a partial area set 200 are learned.

This means that the area 201 which is most suitable as the partial area class of the object to be identified is selected from the partial area and the peripheral areas thereof, and parameters of the partial area classifier are learned based on the feature vector of the area 201. This means that, despite the positional displacement of the same object to be identified between learning images, the parameters of the partial area classifier are learned while correcting the area which is the learning target to the optimal area as an area including an image identified as the object to be identified.

According to this learning, for example, when a partial area classifier that identifies person's legs as an object to be identified is learned, the partial area classifier is learned, based on the feature vector that is input, so as to output 1 when the image included in the area in which the feature vector is generated is legs. Further, the partial area classifier is learned to output 0 when the image included in the area in which the feature vector is generated is not legs based on the feature vector that is input.

Figure 13:
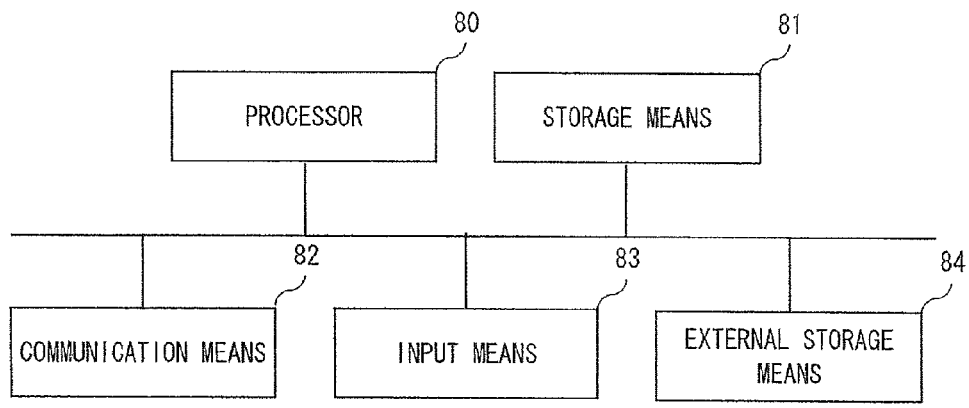
FIG. 13 is a block diagram showing a hardware configuration of a computer according to the exemplary embodiment of the present invention.
Figure 14:
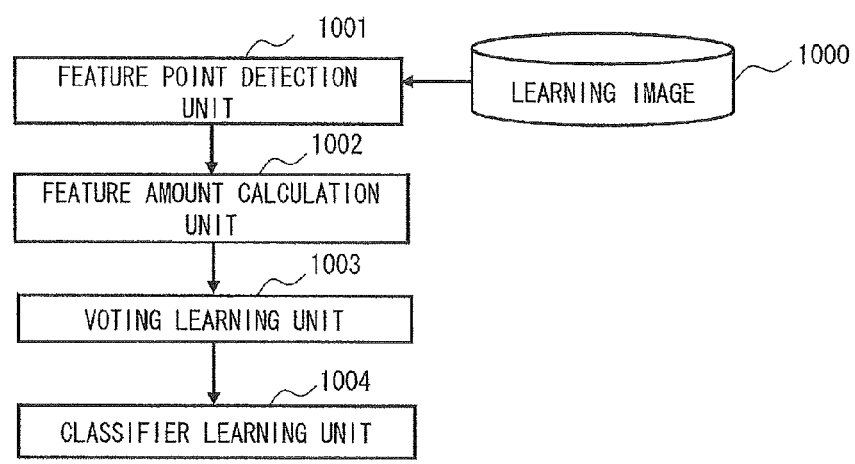
FIG. 14 is a block diagram showing a configuration of one example of a learning apparatus according to a related art.

Note that the selection of the area suitable as the partial area class of the object to be identified may also be performed, as described later with reference to FIG. 13, by receiving an input to select the area suitable as the partial area class of the object to be identified from the partial area set from the user by the input means included in the computer 100.

Further, after completion of the learning of parameters of the partial area classifier, it is possible to specify the positional displacement of the same object to be identified between learning images by the position of the area 201 which is output by the partial area classifier to be the area most likely to be the object to be identified in each partial area set 200. For example, when the partial area classifier outputs 1 according to the input of a feature vector, the area in which the feature vector is generated corresponds to the area 201. Accordingly, it is possible to learn the accurate position of the area including the image which is the object to be identified.

In summary, when the object to be recognized is a person, even when poses of a person are different between learning images and the positions of the hands, legs, heads or the like which is the object to be recognized are relatively different, it is possible to specify the accurate positions. The area 201 indicating these positions is used as the reference position when the relative position of the object to be recognized to the recognition reference point is calculated when the voting pattern is generated. Accordingly, it is possible to generate distribution of the relative position of the recognition reference point of the object to be recognized from the object to be identified with high accuracy when the voting pattern is generated.

The output value of the partial area classifier may not be any of two values of 0 and 1, but may be a continuous value between 0 and 1. The partial area class may be identified by comparing the continuous output value with a predetermined threshold. In this case, the output value of the discriminant function can be used as the identification value indicating the likelihood of being the object to be identified for the area. In summary, the likelihood that the image included in the area which is the identification target is the object to be identified may be output as the output value of the partial area classifier. In this case, the area most suitable as the partial area class of the object to be identified in the partial area set is selected, and the parameters of the partial area classifier are learned so as to determine the likelihood that the image included in the area is the object to be identified to be higher based on the feature vector of the selected area. In summary, the partial area classifier learns so as to determine the area 201 which is most likely to be the object to be identified in the partial area set 200 as the highest likelihood.

The reference position when the relative position of the object to be recognized to the recognition reference point is calculated is not limited to the area 201 which is determined to be the area most likely to be the object to be identified by the partial area classifier. If the partial area classifier is the area which is likely to be the object to be identified, a plurality of areas from the partial area set 200 may be used as the reference positions. For example, when the output value of the partial area classifier is a likelihood, the plurality of areas in the partial area set may be used as the reference positions when the likelihood that the image included in each area is the object to be identified becomes equal to or greater than a predetermined threshold. In summary, the distribution of the relative positions may be generated using these relative position calculated from these reference positions. Further, when the output value of the partial area classifier is one of two values of 0 and 1, the partial area set 200 may include a plurality of areas in which the partial area classifier outputs 1.

Figure 4:
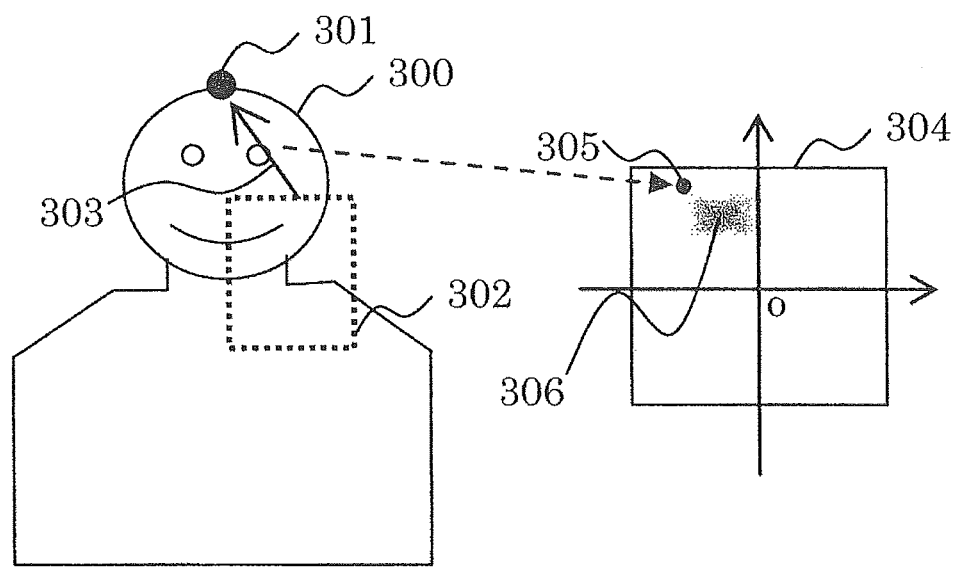
FIG. 4 is a diagram showing a method of generating a voting pattern.

Next, the voting pattern will be described. As shown in FIG. 4, a recognition reference point 301 which is the reference of the position is set as a representative of an object to be recognized 300 for the object to be recognized 300. Now, the partial area voting pattern generation function 105 calculates a relative position 303 to the recognition reference point 301 from the position of an area 302 which is determined that it is likely to be the object to be identified in the partial area set. The partial area voting pattern generation function 105 then votes a point 305 in the relative position 303 from the area 302 into a voting space 304. Such a voting of the point 305 which is the relative position 303 is referred to as "voting of the relative position". This voting of the relative position is performed, for example, on a space including an X axis and a Y axis in the vertical direction and the horizontal direction of the learning image. The position of the area 302 which is the reference of the relative position 303 to the recognition reference point 301 may be any point on the area 302. For example, the reference position may be the center of the upper side of the area 302, as shown in FIG. 4. Accordingly, it is possible to obtain a distribution 306 of the relative position 303 to the recognition reference point 301 from the position of the area including the object to be identified. This distribution 306 is referred to as a voting pattern. The voting pattern is generated so as to correspond to each of the partial area classes of different objects to be recognized. In summary, the relative position 303 calculated from the position of the area 302 which is determined that it is likely to be the object to be identified is voted to the voting pattern corresponding to the partial area class of the object to be identified.

The voting of the relative position is performed by setting a vote value to which a predetermined constant number is added to the point 305 in the relative position 303 on the voting space 304. The vote value in each coordinate position of the voting pattern 304 is first initialized by ALL0, for example. Then, the constant number is added every time the point 305 in the relative position 303 is voted. That is, when the voting is performed twice for the same coordinate position, the vote value in the coordinate position becomes twice as large as the constant number. In the voting of the point 305 in the relative position 303 to the voting pattern 304, instead of using the constant number as a vote value, an identification value indicating the likelihood of being the object to be identified output from the partial area classifier may be used.

Figure 5:
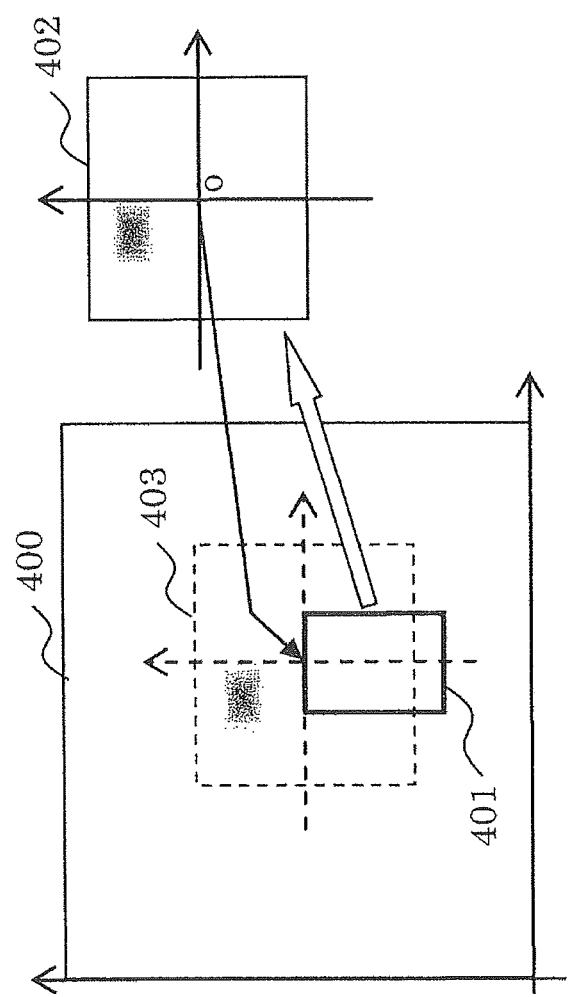
FIG. 5 is a diagram for describing voting.

Next, voting of the voting pattern by the partial area voting function 122 will be described. As shown in FIG. 5, consider a space 400 having a coordinate system same to that of the original image as the voting space as an example. For example, it is assumed that the space 400 having an X axis and a Y axis in the vertical direction and the horizontal direction of the original image is the voting space. In this case, if a partial area 401 in the original image is identified as a partial area class of an object to be identified by the partial area image classifying function 121, a voting pattern 402 for the partial area class is added to the space 400 by setting the position of the partial area 401 to the origin, thereby performing the voting of the voting pattern 402. Such a voting of the voting pattern 402 is referred to as "voting of the voting pattern". The origin may be any point on the partial area 401. For example, as shown in FIG. 5, the center of the upper side of the partial area 401 may be a reference position. Preferably, the origin may be set to the position same to the reference position in the area 302. In this way, by performing the voting of the voting pattern for each partial area, the peak of a vote value 403 is generated in the recognition reference point 301 of the object to be recognized in the voting space. In summary, it is possible to grasp the position of the object to be recognized based on the position of the peak of the vote value 403.

When the partial area classifier outputs the likelihood that the image included in the partial area is the object to be identified, if the likelihood becomes equal to or greater than a predetermined threshold, the voting pattern for the partial area class of the object to be identified may be voted with the position of the partial area as the origin.

Next, the voting weight will be described. Instead of directly adding the value of the voting pattern 402 in the voting of the voting pattern in the partial area voting function 122, it is possible to multiply the partial area weight calculated for the partial area class of each of the objects to be identified by the value of the voting pattern 402 corresponding to the partial area class, and add the multiplied value, for example. Accordingly, it is possible to perform recognition in which the influence of the important partial area class is more enhanced regarding the recognition. The partial area weight is calculated so as to emphasize the influence of the important partial area class by using a predetermined calculation criterion as in Score disclosed in Section 3 of Non-patent literature 4, for example.

Note that all the partial area weights may be made equal in the calculation of the partial area weight in the partial area weight calculation function 106. In this case, the partial area weight has no substantial sense. Thus, the partial area weight calculation function 106 may be omitted.

Further, the calculation of the partial area weight may be performed as follows, as will be described later with reference to FIG. 13. That is, an input of importance is received by input means included in the computer 100 from a user for each partial area class and the weight for each partial area class is calculated so as to be proportional to the importance that is input.

Alternatively, for example, a multi-class classifier that is capable of performing multi-class classification such as a neural network may be prepared as the partial area classifier to achieve classification of all the partial area classes by one multi-class classifier. In this case, the partial area classifier outputs, according to the input of one feature vector, to which partial area class the area in which the feature vector is generated belongs. Further, the partial area classifier may output, according to the input of one feature vector, the likelihood that the area in which the feature vector is generated is a partial area class for each of all the partial area classes.

Further, the similarity between partial areas classified as partial object classes with different objects to be identified from each other may be defined by an evaluation value such as the probability of incorrect classification as a partial area class of the other partial area from each other, closeness of each parameter of the partial area classifier that classifies the partial area class corresponding to each partial area, and a distance between feature vectors of the respective partial areas, for example. Then, both of the partial areas with high similarity may use a partial area classifier that performs classification as any one partial area class of partial area classes with different objects to be identified stated above. For example, the evaluation value is defined to be higher as the similarity between partial areas becomes higher, and when the evaluation value is equal to or greater than a predetermined value, it is determined that the similarity between partial areas is high. In this case, the voting pattern in which each voting pattern corresponding to each partial area class is synthesized in consideration of the partial area weight may be used. Specifically, the voting pattern obtained by multiplying the voting pattern corresponding to each partial area class by a value proportional to the partial area weight with respect to each of the partial area classes, and then adding the voting pattern to the multiplication result may be used. For example, by causing the partial area classifier to output the information indicating the original partial area class, the voting pattern which is to be synthesized may be identified.

Further, instead of using original images as stated in this exemplary embodiment, processing images on which processing such as filtering or geometric transformation is performed may be used.

Further, as the feature vector according to this exemplary embodiment, any feature that can be typically used in image identification (e.g., a pixel value of an original image, a pixel value of a processed image in which processing such as filtering or geometric transformation is performed on the original image, a Haar-like feature disclosed in Non-patent literature 2, and a HOG feature disclosed in Non-patent literature 3) may be used.

Further, as the partial area classifier according to this exemplary embodiment, a classifier that can be typically used in image identification (e.g., a neural network, a linear classifier, a support vector machine, a cascade classifier as disclosed in Non-patent literature 2, a vector quantizer) may be used.

Figure 6:
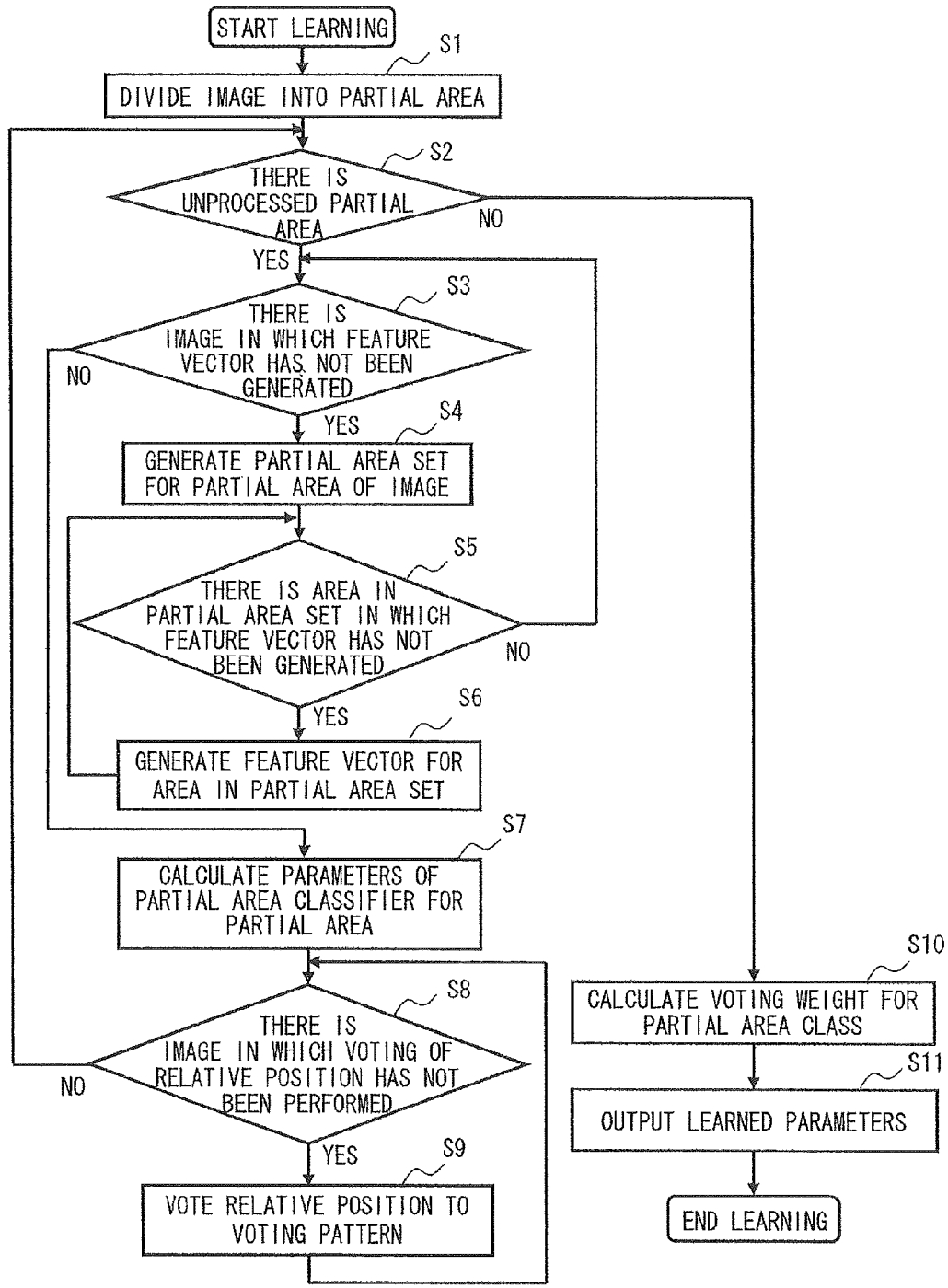
FIG. 6 is a flowchart showing a learning operation of the image recognition system according to the exemplary embodiment of the present invention.
Figure 7:
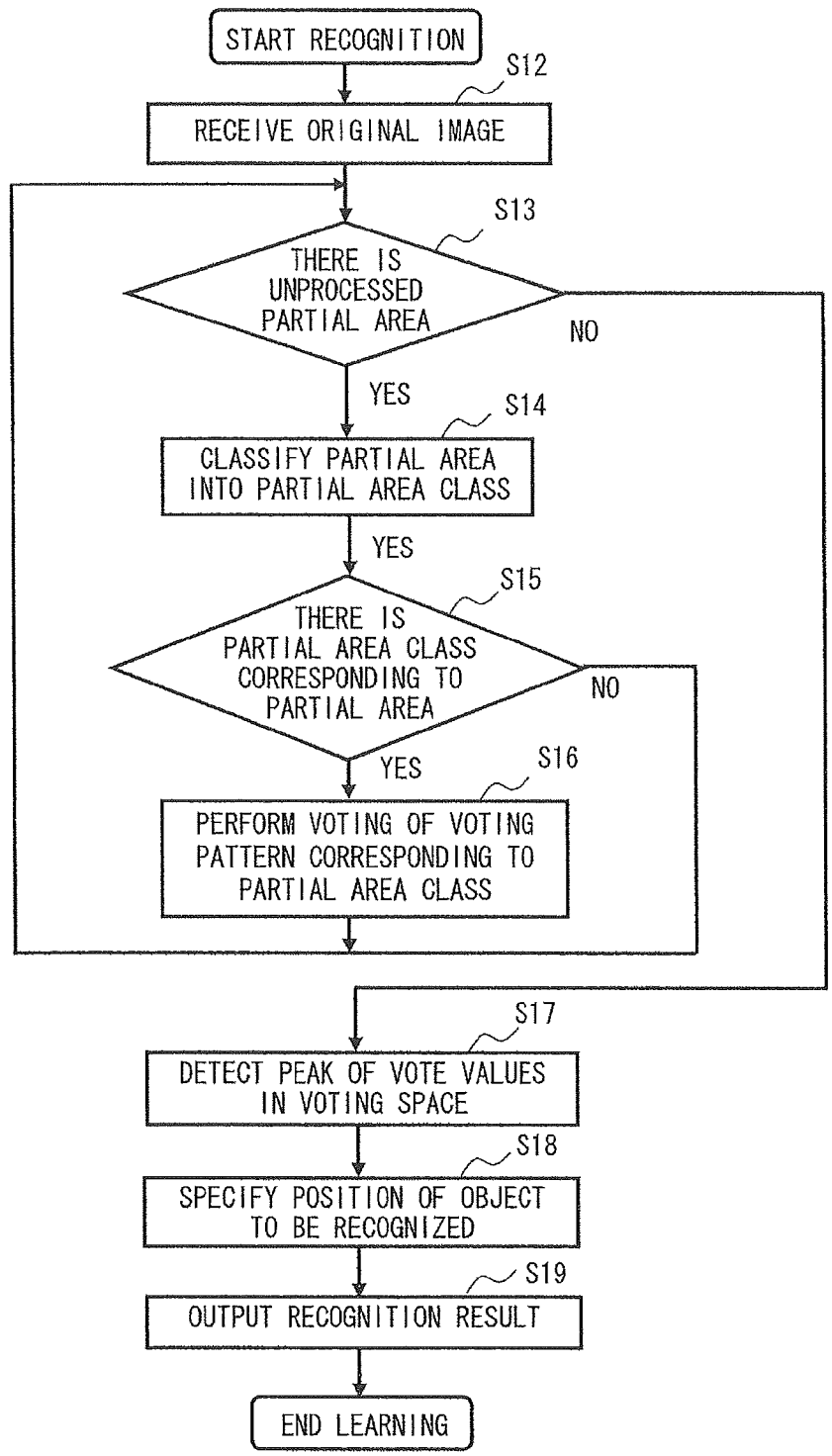
FIG. 7 is a flowchart showing an identifying operation of the image recognition system according to the exemplary embodiment of the present invention.

Next, with reference to FIG. 2 and flowcharts shown in FIGS. 6 and 7, the whole operation of the image recognition system according to this exemplary embodiment will be described in detail.

Since the operation of the image recognition system according to the exemplary embodiment includes two operations of a learning operation processed by the computer 100 and an identifying operation processed by the computer 120, these two operations will be separately described below.

First, with reference to FIG. 6, the learning operation will be described in detail.

First, the image dividing function 101 divides each image in the image database 110 into a plurality of partial areas (S1). Next, the computer 100 determines whether there is a partial area that has not been processed in all the partial areas (S2). When the computer 100 determines that there is a partial area that has not been processed, the process goes to Step S3 (S2: YES). In this case, each of the partial areas located in the same position between images in the image database 110 is selected as a partial area to be processed. The partial area selected here is any partial area of the partial areas that have not been processed. When the computer 100 determines that there is no partial area that has not been processed, the process goes to Step S10 (S2: NO).

The computer 100 determines whether there is an image in which the feature vector for the partial area has not been calculated in the image database 110 (S3). The target partial area here is the partial area selected in S2. When the computer 100 determines that there is an image in which the feature vector for the partial area has not been calculated, the process goes to Step S4 (S3: YES). When the computer 100 determines that there is no image in which the feature vector for the partial area has not been calculated, the process goes to Step S7 (S3: NO).

The partial area set generation function 102 generates, for each partial area of the image, a partial area set including the partial area (S4). The target image here is any one of the images in which the feature vector for the partial area has not been calculated. Further, the partial area used to generate the partial area set is the partial area selected in S2. Further, the computer 100 determines whether there is an area in which the feature vector has not been generated in the partial area set (S5). When the computer 100 determines that there is an area in which the feature vector has not been generated, the process goes to Step S6 (S5: YES). When the computer 100 determines that there is no area in which the feature vector has not been generated, the process goes to Step S3 (S5: NO). The feature vector generation function 103 generates a feature vector for an area in the partial area set (S6). The target area here is any of the areas in which the feature vectors have not been calculated in the partial area set generated in S4. According to these processing, the processing in Steps S5 and S6 are repeated until the completion of generation of the feature vector for all the areas included in the partial area set generated in Step S4. Further, the processing in Steps S3 to S6 is repeated until the completion of generation of the feature vector regarding the partial area selected in S2 for all the images in the image database 110.

The classifier parameter/partial area position learning function 104 calculates parameters of the partial area classifier based on the framework of Multiple Instance Learning using the feature vector generated from each of the areas that belong to the partial area set (S7). The target feature vector here is the feature vector generated in S6 regarding the partial area selected in S2. Furthermore, the computer 100 determines whether there is an image in which voting of the relative position to the voting pattern corresponding to the partial area class has not been performed in the image database 110 (S8). When the computer 100 determines that there is an image in which voting of the relative position has not been performed, the process goes to Step S9 (S8: YES). When the computer 100 determines that there is no image in which voting of the relative position has not been performed, the process goes to Step S2 (S8: NO). The partial area voting pattern generation function 105 votes the relative position to the recognition reference point of the object to be recognized from an area with maximum identification value in the partial area set into the voting space (S9). The target partial area set is a partial area set in any of the images in which voting of the relative position has not been performed. Further, this partial area set is the partial area set generated in S4 for the partial area selected in S2. According to these processing, processing in Steps S8 and S9 is repeated until the completion of the voting of the relative position regarding the partial area selected in S2 for all the images in the image database 110.

The partial area weight calculation function 106 calculates a voting weight for each partial area class so as to optimize the identification between the object to be recognized and the rest (S10). Further, the recognition parameter output function 107 outputs learned parameters (S11).

In the learning operation, the subject that performs Step S1 to Step S11 is the computer 100, which operates based on a program, for example.

Next, with reference to FIG. 7, the identifying operation will be described in detail.

First, the computer 120 receives by the image input device 130 an original image that is taken (S12). Next, the computer 120 determines whether there is a partial area that has not been processed in partial areas in the original image (S13). When the computer 120 determines that there is a partial area that has not been processed, the process goes to Step S14 (S13: YES). When the computer 120 determines that there is no partial area that has not been processed, the process goes to Step S17 (S13: NO).

The partial area image classifying function 121 classifies the partial area into the partial area class (S13). The target partial area is any partial area of the partial areas that are determined to be unprocessed. The computer 120 then determines whether there is a partial area class of an object to be identified corresponding to the partial area (S14). In other words, the computer 120 determines whether the partial area is classified into the partial area class of the object to be identified. When the computer 120 determines that there is a partial area class corresponding to the partial area, the process goes to Step S16 (S15: YES). When the computer 120 determines that there is no partial area class corresponding to the partial area, the process goes to Step S13 (S15: NO). The partial area voting function 122 performs voting of the voting pattern to the voting space based on the partial area weight and the voting pattern corresponding to the partial area class (S16). Specifically, the partial area voting function 122 multiples the voting pattern corresponding to the partial area class by the partial area weight corresponding to the partial area class, and then votes the voting pattern to the voting space. From these processing, processing in Steps S13 to S16 is repeated until the completion of the classification into the partial area class and the voting of the voting pattern for all the partial areas in the original image.

The voting peak detection function 123 detects the peak of the vote values in the voting space (S17). The object recognition function 124 specifies the position of the object to be recognized based on the position of the peak of the vote values in the voting space (S18). The recognition result output function 125 outputs the position of the object to be recognized that is specified as the recognition result (S19).

The subject that performs Step S12 to Step S19 in the identifying operation is the computer 120, which operates based on the program, for example.

Next, the effects of this exemplary embodiment will be described.

Since the partial areas are directly identified in this exemplary embodiment, there is no need to perform detection of feature points and this exemplary embodiment can also be applied to an object including a curved line in which it is difficult to detect the feature points. Further, in this exemplary embodiment, when learning of the partial area classifier is performed for a partial area, a partial area set including the partial area and a plurality of peripheral areas included in a predetermined range with reference to the partial area is generated. Then, the partial area classifier is learned based on an area including an image suitable to be determined as the object to be identified among the plurality of areas included in the partial area set. In short, both of the partial area and the peripheral areas thereof are set to the learning target in the learning image. Accordingly, it is possible to learn the partial area classifier by more suitable areas and to improve the performance of the partial area classifier. Accordingly, it is possible to perform more robust recognition.

Further, in this exemplary embodiment, the object to be recognized is recognized by performing voting in consideration of the individual difference in positions of the partial areas including the object to be identified between objects to be recognized. More specifically, in this exemplary embodiment, the voting pattern indicating distribution of the relative position of the object to be recognized is generated based on the position of an area determined by the partial area classifier to be an area which is likely to be the object to be identified. Accordingly, it is possible to generate the voting pattern which indicates the distribution of the relative position of the object to be recognized with high accuracy. Accordingly, it is possible to perform robust recognition of the object to be recognized considering the individual difference in shapes between the objects to be recognized according to the voting result of the voting pattern. In summary, the parameters of the partial area classifier and the position of the area which is likely to be the object to be recognized based on the result of learning are simultaneously learned. Accordingly, it is possible to optimally combine the identification result by the partial area classifier and voting to the voting space.

EXAMPLE

Next, an operation of the best mode of executing the present invention will be described using a specific example.

Figure 8:
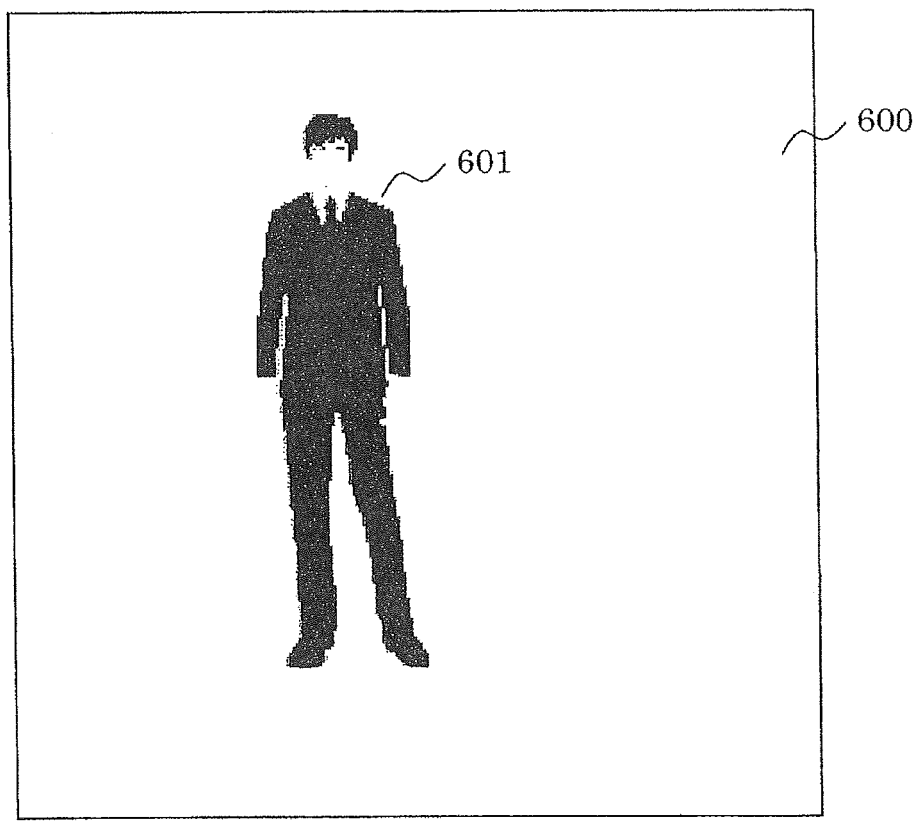
FIG. 8 is a diagram showing an example of an original image which is a recognition target.

In this example, as shown in FIG. 8, it is assumed that a luminance image 600 is an original image, and a person 601 is recognized from the original image, for example.

Figure 9:
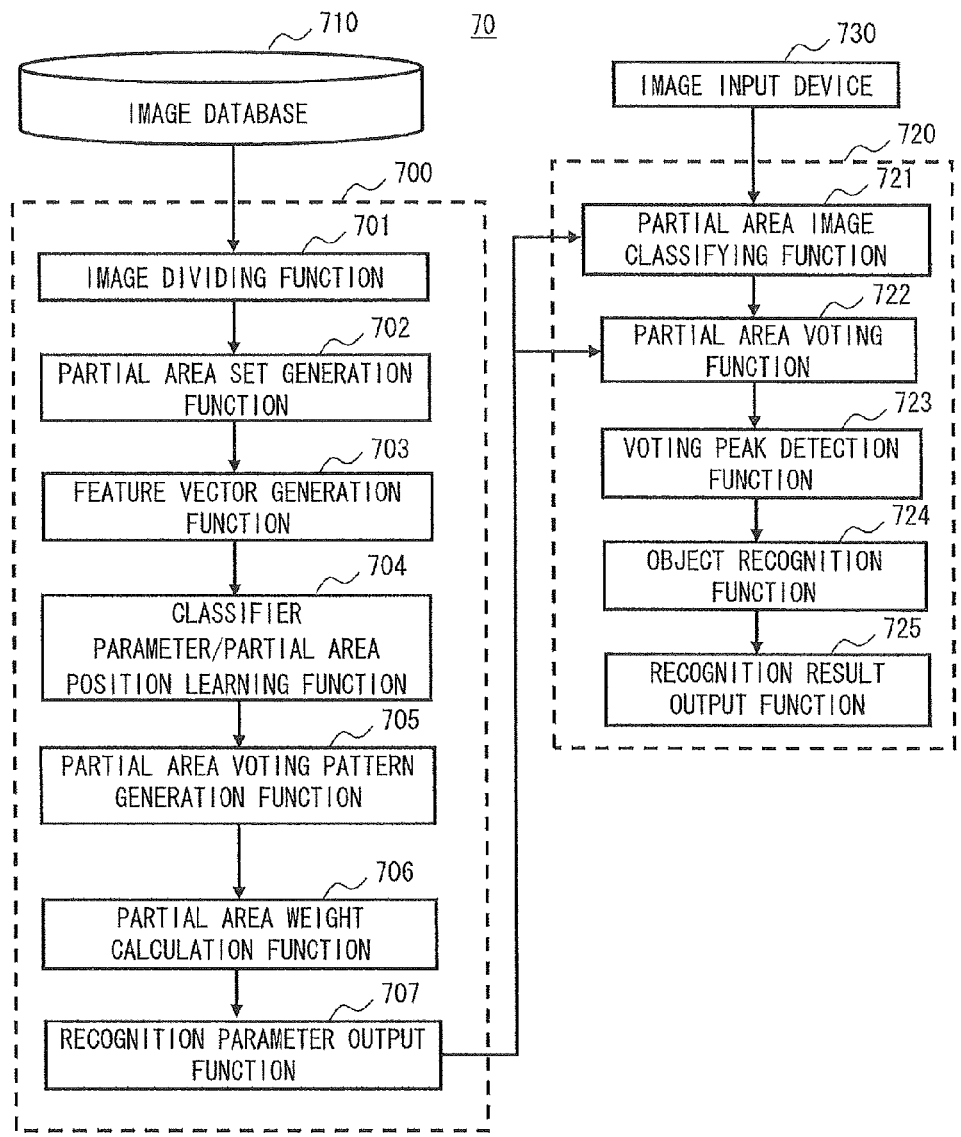
FIG. 9 is a block diagram showing a configuration of a specific example of the image recognition system according to the exemplary embodiment of the present invention.

This example includes, as shown in FIG. 9, computers 700 and 720 operated by program control, an image database 710, and an image input device 730. Each of the computers 700 and 720 includes a processor (also referred to as a central processing unit or a data processing unit) (not shown).

The computer 700 includes an image dividing function 701, a partial area set generation function 702, a feature vector generation function 703, a classifier parameter/partial area position learning function 704, a partial area voting pattern generation function 705, a partial area weight calculation function 706, and a recognition parameter output function 707.

The computer 720 includes a partial area image classifying function 721, a partial area voting function 722, a voting peak detection function 723, an object recognition function 724, and a recognition result output function 725. The computer 700 and the functions 701-707 included in the computer 700 correspond to the computer 100 and the functions 101-107 included in the computer 100, respectively, and the computer 720 and the functions 721-725 included in the computer 720 correspond to the computer 120 and the functions 121-125 included in the computer 120, respectively. Accordingly, the contents same to those already described in the exemplary embodiment above will be partially omitted as appropriate.

These means substantially perform as follows.

Figure 10:
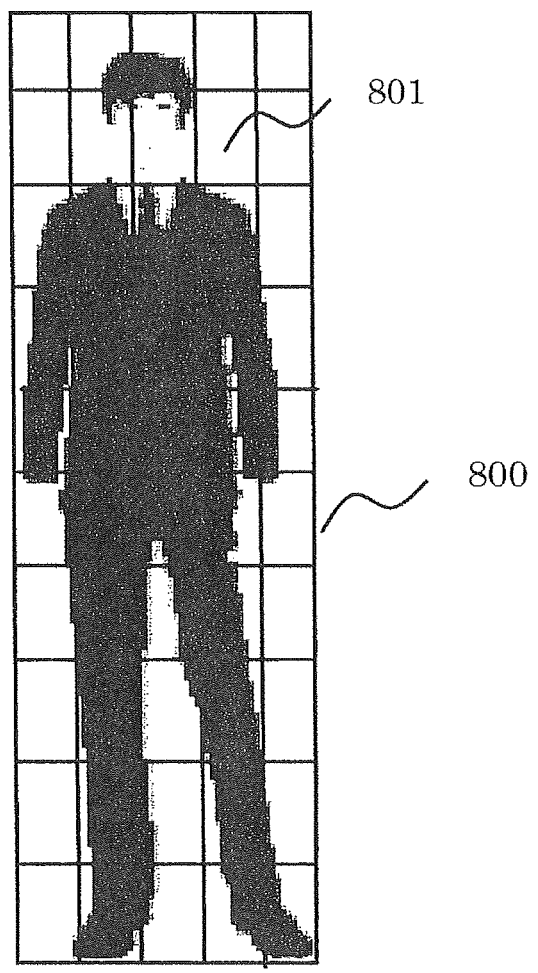
FIG. 10 is a diagram describing division into partial areas.

The image database 710 stores images including the object to be recognized and images that do not include the object to be recognized as the learning images required for learning of the classifier parameter/partial area position learning function 704. The image dividing function 701 divides the object to be recognized in each image in the image database 710 into a plurality of partial areas 801 with the width of 5× the length of 10, each partial area having a rectangular shape and having a size, as shown in FIG. 10, for example. The number of divisions is not limited to these values shown above. Further, in this way, a predetermined range including the object to be recognized in the learning image may be set to the learning target, or the area that includes only the object to be recognized or the whole learning image may be set to the learning target. Preferably, by setting a predetermined range including the object to be recognized or the area that includes only the object to be recognized to the learning target, it is possible to reduce the probability that learning is performed by the areas that do not include the object to be identified, thereby being able to perform learning to further improve the performance of the partial area classifier. Further, images including only the object to be recognized may be prepared as learning images.

The partial area set generation function 702 generates, for each partial area, each of areas obtained by shifting the partial area by one pixel in the up/down/right/left directions in a range of the length of 0 to 10% of the horizontal width of the learning image 800 as peripheral areas, for example, thereby generating a partial area set including the partial area and a plurality of peripheral areas thereof. The feature vector generation function 703 generates, for each of the plurality of areas included in the partial area set, a vector whose element is a pixel value of the learning image 800 as a feature vector. The range in which the partial area is shifted in the up/down/right/left directions and the number of pixels to shift the partial area are not limited to these examples.

The classifier parameter/partial area position learning function 704 learns parameters of the partial area classifier while selecting the area that is most suitable as the partial area class from the partial area set based on the framework of Multiple Instance Learning such as Multiple Instance Learning Boosting disclosed in Non-patent literature 1, for example. Accordingly, the parameters of the partial area classifier corresponding to the partial area class are learned. When Multiple Instance Learning Boosting disclosed in Non-patent literature 1 is used, the partial area classifier may be the cascade classifier disclosed in Non-patent literature 2. The cascade classifier is a so-called Viola-Jones classifier.

Further, to learn the relative position of the object to be recognized with respect to the object to be identified, the area which is determined by the partial area classifier to be the area which is most likely to be the object to be identified is selected in each partial area set after completion of learning of parameters of the partial area classifier. Accordingly, regardless of the positional displacement of the object to be identified between learning images, the accurate position of the area which is likely to be the object to be identified is learned. The partial area voting pattern generation function 705 generates the voting pattern for the partial area class of the object to be identified based on the relative position of the object to be recognized with respect to the object to be identified that is calculated. It is assumed that the vote value voted to the relative position in the voting pattern in generation of the voting pattern is a constant number. The partial area weight calculation function 706 calculates the partial area weight for each partial area class so as to optimize the identification between the object to be recognized and the rest by the framework stated in the section 3 of Non-patent literature 4, for example. The recognition parameter output function 707 outputs each parameter that is learned.

The image input device 730 supplies the original image to the computer 720. The partial area image classifying function 721 classifies each partial area of the original image into each partial area class by each partial area classifier. The target of the partial areas of the original image is all the rectangular partial areas having the following size and position. That is, the size of the partial area is such that the horizontal width is one of the lengths different by one pixel unit within a range of $\frac{1}{10}$ to $\frac{1}{4}$ of the horizontal width of the original image, the vertical width is set to four times as long as the horizontal width, and the position of the partial area is all or a plurality of partial areas that may be when the partial area is set to any of the positions within the original image.

As described above, in this example, learning is performed for each of the partial area groups generated by dividing the original image by different sizes. Accordingly, even when the size of the object to be recognized in the original image cannot be predicted, it is possible to identify the object to be identified by the partial area with appropriate size of any partial area group. The horizontal width and the vertical width of the partial area, and the ratio of the vertical width of the partial area to the horizontal width of the partial area are not limited to the values shown above.

The partial area voting function 722 votes into the voting space, for each partial area in the original image, using a value obtained by multiplying the voting pattern corresponding to the partial area class of each partial area by the partial area weight as a vote value. The space having the same coordinate system as that in the original image is used as the voting space. The voting peak detection function 723 detects the peak of the vote values in the voting space. The voting peak detection function 723 detects a point in the voting space having a vote value which is equal to or greater than a predetermined threshold and is a local maximum value in the neighboring 3×3 partial area as a peak. The neighboring 3×3 partial area with respect to one point in the voting space means the range that includes the partial area including this point and partial areas each having the same size as the partial area and adjacent to the partial area in the up/down/right/left and oblique directions, for example. Further, the predetermined threshold is a value obtained by multiplying the maximum value of the partial area weight by an appropriate multiplier (e.g., 10). Note that the multiplier and the range of the area to determine the local maximum value are not limited to these values. The object recognition function 724 performs recognition of the object by setting the position of the peak of the vote in the voting space to the position of the object to be recognized. The recognition result output function 725 outputs the recognition result of the object to be recognized.

Figure 11:
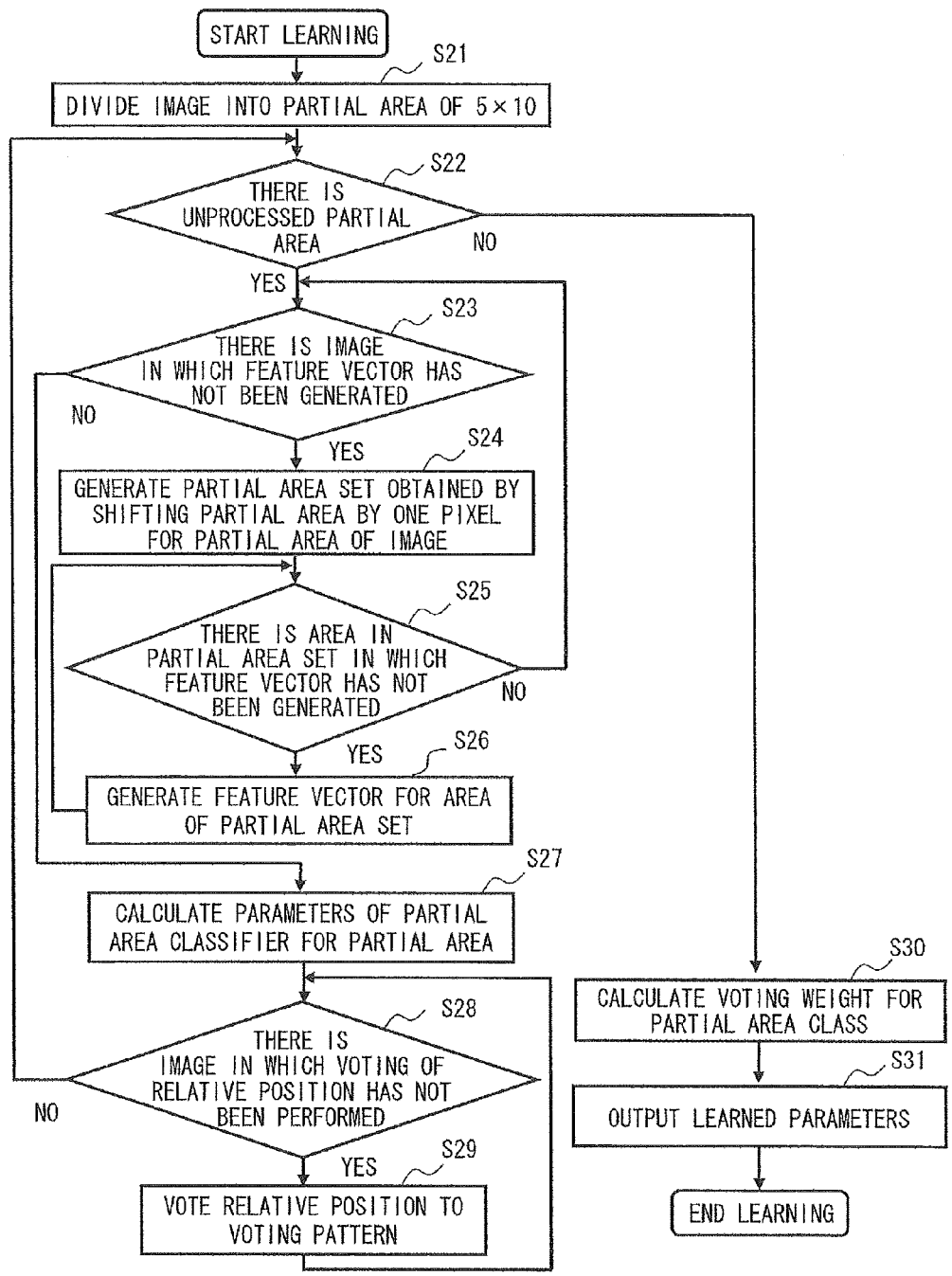
FIG. 11 is a flowchart showing a learning operation of a specific example of the image recognition system according to the exemplary embodiment of the present invention.
Figure 12:
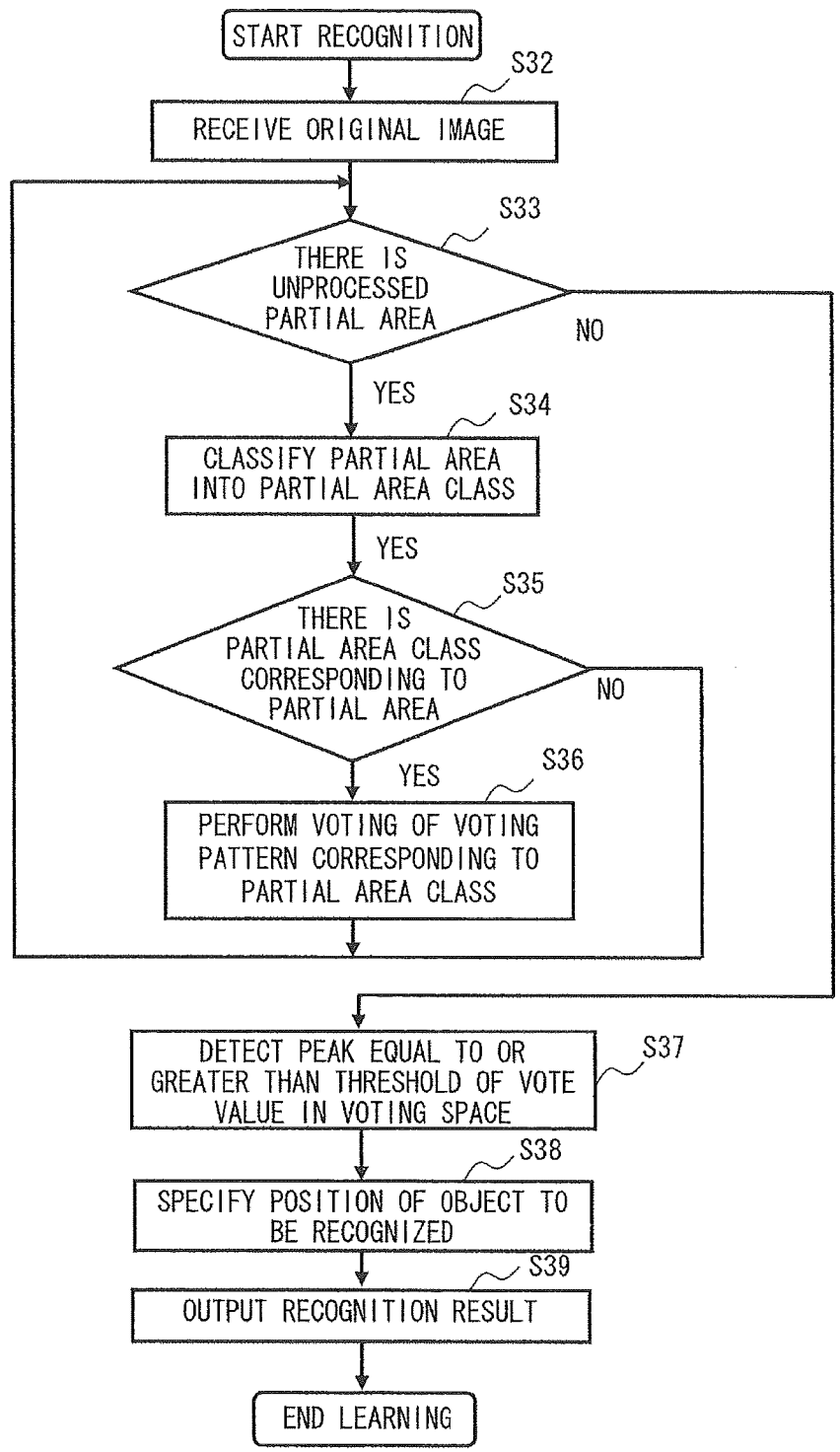
FIG. 12 is a flowchart showing an identifying operation of a specific example of the image recognition system according to the exemplary embodiment of the present invention.

Next, with reference to flowcharts shown in FIGS. 11 and 12, an operation according to this example including the components described above will be described in detail.

Since the operation in this example includes two operations of a learning operation processed by the computer 700 and an identifying operation processed by the computer 720, these two operations will be separately described below.

First, with reference to FIG. 11, the learning operation will be described in detail.

First, the image dividing function 701 divides each image in the image database 710 into a plurality of partial areas with the width of 5× the length of 10, as shown in FIG. 10, for example (S21). Next, the computer 700 determines whether there is a partial area that has not been processed in all the partial areas (S22). When the computer 700 determines that there is a partial area that has not been processed, the process goes to Step S23 (S22: YES). When the computer 700 determines that there is no partial area that has not been processed, the process goes to Step S30 (S22: NO).

The computer 700 determines whether there is an image in which the feature vector for the partial area has not been calculated in the image database 710 (S23). When the computer 700 determines that there is an image in which the feature vector has not been calculated, the process goes to Step S24 (S23: YES). When the computer 100 determines that there is no image in which the feature vector for the partial area has not been calculated, the process goes to Step S27 (S23: NO). The partial area set generation function 702 generates, for each partial area of the image, each of areas obtained by shifting the partial area by one pixel in the up/down/right/left directions in a range of the length of 0 to 10% of the horizontal width of the learning image 800 as peripheral areas, for example, thereby generating a partial area set (S24).

Further, the computer 700 determines whether there is an area in which the feature vector has not been generated in the partial area set (S25). When the computer 700 determines that there is an area in which the feature vector has not been generated, the process goes to Step S26 (S25: YES). When the computer 100 determines that there is no area in which the feature vector has not been generated, the process goes to Step S23 (S25: NO). The feature vector generation function 703 generates, for each of the areas of the partial area set, a feature vector whose element is a pixel value (S26). The classifier parameter/partial area position learning function 704 calculates the parameters of the partial area classifier based on the framework of Multiple Instance Learning such as Multiple Instance Learning Boosting disclosed in Non-patent literature 1, for example, using the feature vector generated from each of the areas that belong to the partial area set (S27). The partial area classifier may be the cascade classifier (so-called a Viola-Jones classifier) disclosed in Non-patent literature 2, for example.

Further, the computer 700 determines whether there is an image in the image database 710 in which voting of the relative position to the voting pattern corresponding to the partial area class has not been performed (S28). When the computer 700 determines that there is an image in which voting of the relative position has not been performed, the process goes to Step S29 (S28: YES). When the computer 100 determines that there is no image in which voting of the relative position has not been performed, the process goes to Step S22 (S28: NO). The partial area voting pattern generation function 705 adds a constant number to a vote value in the relative position to the recognition reference point of the object to be recognized from an area having the maximum identification value in the partial area set corresponding to the partial area in the voting pattern (S29). The partial area weight calculation function 706 calculates a voting weight for each partial area class so as to optimize identification between the object to be recognized and the rest by the framework disclosed in section 3 of Non-patent literature 4, for example (S30). Further, the recognition parameter output function 707 outputs learned parameters (S31).

In the learning operation, the subject that performs Step S21 to Step S31 is the computer 700, which operates based on a program, for example.

Next, with reference to FIG. 12, the identifying operation will be described in detail.

First, the computer 720 receives by the image input device 730 an original image that is taken (S32). Next, the computer 720 determines whether there is a partial area in the original image that has not been processed (S33). The partial area in the original image is set so that the horizontal width is one of the lengths different by one pixel unit within a range of 1/10 to 1/4 of the horizontal width of the original image, the vertical width is set to four times as long as the horizontal width, and the position is all or a plurality of rectangular areas that may be when the position is set to any of the positions within the original image. When the computer 720 determines that there is a partial area that has not been processed, the process goes to Step S34 (S33: YES). When the computer 720 determines that there is no partial area that has not been processed, the process goes to Step S37 (Step S33: NO). The partial area image classifying function 721 classifies the partial area into the partial area class by the cascade classifier (so-called a Viola-Jones classifier) disclosed in Non-patent literature 2, for example (S34).

Furthermore, the computer 720 determines whether there is a partial area class of an object to be identified corresponding to the partial area (S35). When the computer 720 determines that there is a partial area class of an object to be identified corresponding to the partial area, the process goes to Step S36 (S35: YES). When the computer 720 determines that there is no partial area class of an object to be identified corresponding to the partial area, the process goes to Step S33 (S35: NO). The partial area voting function 722 votes a value obtained by multiplying the voting pattern corresponding to the partial area class by the partial area weight into the voting space (S36). The voting peak detection function 723 detects a point in the voting space having a vote value which is equal to or greater than a threshold and is a local maximum value in the neighboring 3×3 partial area as a peak of the vote values in the voting space (S37). For example, a value obtained by multiplying the maximum value of the partial area weight by an appropriate multiplier (e.g., 10) is set to the threshold. Further, the object recognition function 724 sets the position of the peak of the vote values to the position of the object to be recognized, thereby specifying the position of the object to be recognized (S38). Furthermore, the recognition result output function 725 outputs the position of the object to be recognized as the recognition result (S39).

In the identifying operation, the subject that performs Step S32 to Step S39 is the computer 720, which operates based on a program, for example.

Subsequently, with reference to FIG. 13, hardware configurations of the computers 100 and 120 according to the exemplary embodiment of the present invention will be described. FIG. 13 is a block diagram showing the hardware configurations of the computers 100 and 120 according to the exemplary embodiment of the present invention.

Each of the computers 100 and 120 includes a processor 80, a storage means 81, a communication means 82, an input means 83, and an external storage means 84.

The processor 80 executes the learning operation or the identifying operation according to the exemplary embodiment by executing a program that executes processing in the exemplary embodiment stated above.

The storage means 81 stores a program that executes processing in the exemplary embodiment stated above, data indicating the discriminant function that functions as the partial area classifier, and various kinds of data generated and calculated in the learning operation or the identifying operation. The storage means 81 is, for example, a memory, a hard disc drive, or an optical disk drive.

The communication means 82 is an interface that transmits and receives arbitrary data to and from another computer via any desired communication network. For example, the recognition parameter output function 107 of the computer 100 outputs data such as parameters of the classifier to the computer 120 by the communication means 82. The partial area image classifying function 121 and the partial area voting function 122 of the computer 120 acquire data output from the computer 100 by the communication means 82.

The input means 83 receives the input of the input contents from the user as stated above. The input means 83 outputs data indicating the input contents to the processor 80. The processor 80 recognizes the input contents from the user based on the data output from the input means 83.

An external storage medium is inserted into or removed from the external storage means 84. The external storage medium is, for example, a universal serial bus (USB) memory, an external hard disc, a writable optical disc. The external storage means 84 is an interface that writes or reads arbitrary data to or from the external storage medium. For example, the recognition parameter output function 107 of the computer 100 may write data such as parameters of the classifier to the external storage medium by the external storage means 84. In this case, the user is able to remove the external storage medium storing the data from the computer 100 and insert the external storage medium into the external storage means 84 of the computer 120. Then, the partial area image classifying function 121 and the partial area voting function 122 of the computer 120 may read out data by the external storage means 84 from the external storage medium that is inserted.

While the present invention has been described above with reference to the exemplary embodiment, the present invention is not limited to the above exemplary embodiment. The configurations and details of the present invention can be modified in various manners which can be understood by those skilled in the art within the scope of the invention.

While the case in which partial areas are generated by dividing a learning image has been described in this exemplary embodiment, it is not limited to this. For example, the partial areas of the learning image and the original image may be determined to be separated from each other by a predetermined pixel number.

While described in the exemplary embodiment is the case in which the computer 100 performs the learning operation and the computer 120 performs the identifying operation, the number of computers is not limited to this. For example, one computer may execute the learning operation and the identifying operation, or a plurality of computers may execute the learning operation or the identifying operation.

Further, the aforementioned program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, not only the case in which the functions of the aforementioned exemplary embodiment are achieved by the computer executing the program for achieving the functions of the aforementioned exemplary embodiment, but also a case in which the functions of the aforementioned exemplary embodiment are achieved by the program collaborating with an operating system (OS) or an application software operated on the computer is included in the exemplary embodiment of the present invention. Furthermore, a case in which the functions of the aforementioned exemplary embodiment are achieved by a function expansion board inserted into the computer or a function expansion unit connected to the computer that performs all or a part of the processing of this program is also included in the exemplary embodiment of the present invention.

A part or all of the exemplary embodiment stated above may be described as shown in the following Supplementary notes. However, it is not limited to them.

(Supplementary note 1) An image recognition system comprising: image recognition means for recognizing an object to be recognized included in an input image based on a result of determination by a classifier, the classifier determining a likelihood that an image included in an arbitrary area in the input image including the object to be recognized having an object to be identified is the object to be identified based on a feature amount regarding the area; partial area determination means for determining a plurality of learning partial areas in a learning image including the object to be recognized; partial area set generation means for generating a learning partial area set based on the learning partial area, the learning partial area set including the learning partial area and a plurality of peripheral areas included in a predetermined range with reference to the learning partial area; and learning means for selecting, when performing learning of the classifier for the learning partial area, an area including an image suitable to be determined as the object to be identified from a plurality of areas included in the learning partial area set generated by the learning partial area, to learn the classifier so as to determine the likelihood that the image included in the area is the object to be identified to be higher based on a feature amount related to the selected area.

(Supplementary note 2) The image recognition system according to Supplementary note 1, wherein the learning means calculates, when the likelihood that the classifier determines the image included in the area as the object to be identified based on a feature amount regarding the area is learned to become equal to or greater than a predetermined likelihood, a relative position of a reference point set in advance for the object to be recognized including the object to be identified from the area, the image recognition system further comprises voting pattern generation means for generating a voting pattern indicating distribution of the relative position calculated by the learning means, and the image recognition means comprises: identification means for determining a plurality of input partial areas in the input image to determine by the classifier the likelihood that an image included in the input partial area is the object to be identified based on a feature amount regarding the input partial area; voting means for voting, when the likelihood that the image included in the input partial area is the object to be identified is equal to or greater than a predetermined likelihood, the voting pattern to a predetermined voting space with reference to the position of the input partial area; and object recognition means for recognizing the object to be recognized based on a voting result to the voting space.

(Supplementary note 3) The image recognition system according to Supplementary note 2, wherein the likelihood equal to or greater than the predetermined likelihood is the highest likelihood among likelihoods determined for the plurality of respective areas included in the learning partial set.

(Supplementary note 4) The image recognition system according to Supplementary note 2, wherein the classifier determines whether the image included in the area is the object to be identified, the learning means learns the classifier to determine that the image included in the area is the object to be identified based on a feature amount related to the selected area, and calculates the relative position of the reference point from the area when the classifier is learned to determine that the image included in the area is the object to be identified, the identification means determines by the classifier whether the image included in the input partial area is the object to be identified, and the voting means performs the voting when it is determined that the image included in the input partial area is the object to be identified.

(Supplementary note 5) The image recognition system according to any one of Supplementary notes 2 to 4, wherein: the object to be recognized includes a plurality of objects to be identified, the voting pattern generation means generates a plurality of voting patterns so as to correspond to the plurality of respective objects to be identified and to indicate distribution of the relative position of the corresponding objects to be identified, and the voting means votes the voting pattern corresponding to the object to be identified when the likelihood that the image included in the input partial area is the object to be identified is equal to or greater than the second predetermined likelihood.

(Supplementary note 6) The image recognition system according to Supplementary note 5, wherein the image recognition system further comprises weight calculation means for calculating, for each of the plurality of objects to be identified, a weight of the voting pattern corresponding to the object to be identified based on a predetermined calculation criterion, and the voting means performs voting while applying the weight to a voting pattern corresponding to the voting pattern.

(Supplementary note 7) The image recognition system according to Supplementary note 5 or 6, wherein the image recognition system comprises one classifier, and the one classifier determines, for each of the plurality of objects to be identified, the likelihood that an image included in the area is the object to be identified based on a feature amount regarding the area.

(Supplementary note 8) The image recognition system according to claim 5 dependent from Supplementary note 4, wherein the plurality of input partial areas comprises a first input partial area and a second input partial area including images of objects to be identified different from each other, and when a similarity of the first input partial area and the second input partial area becomes equal to or greater than a predetermined similarity, the classifier determines that both of the first input partial area and the second input partial area are the object to be identified of the image included in any one of the first input partial area and the second input partial area.

(Supplementary note 9) The image recognition system according to any one of Supplementary notes 1 to 8, wherein the classifier comprises at least one of a neural network, a linear classifier, a support vector machine, a cascade classifier, and a vector quantizer.

(Supplementary note 10) The image recognition system according to any one of Supplementary notes 1 to 9, wherein the voting space has the same coordinate system as a coordinate system in which coordinate axes are set in a vertical direction and a horizontal direction of the input image.

(Supplementary note 11) The image recognition system according to any one of Supplementary notes 1 to 10, wherein the partial area determination means divides the learning image into a plurality of areas to determine the plurality of areas as the plurality of learning partial areas, and the identification means determines all or a plurality of areas that may be when a size is set to any of sizes different from each other in a predetermined range and a position is set to any of positions in the input image as the plurality of input partial areas.

This application is based upon and claims the benefit of priority from Japanese Patent Application No. 2011-059356, filed on Mar. 17, 2011, the disclosure of which is incorporated herein in its entirety by reference.

REFERENCE SIGNS LIST

5, 10, 70 IMAGE RECOGNITION SYSTEM
50 PARTIAL AREA DETERMINATION MEANS
51 PARTIAL AREA SET GENERATION MEANS
52 LEARNING MEANS
80 PROCESSOR
81 STORAGE MEANS
82 COMMUNICATION MEANS
83 INPUT MEANS

84 EXTERNAL STORAGE MEANS
100, 120, 700, 720 COMPUTER
101, 701 IMAGE DIVIDING FUNCTION
102, 702 PARTIAL AREA SET GENERATION FUNCTION
103, 703 FEATURE VECTOR GENERATION FUNCTION
104, 704 CLASSIFIER PARAMETER/PARTIAL AREA POSITION LEARNING FUNCTION
105, 705 PARTIAL AREA VOTING PATTERN GENERATION FUNCTION
106, 706 PARTIAL AREA WEIGHT CALCULATION FUNCTION
107, 707 RECOGNITION PARAMETER OUTPUT FUNCTION
108, 708 FEATURE VALUE VECTOR CALCULATION FUNCTION
110, 710 IMAGE DATABASE
121, 721 PARTIAL AREA IMAGE CLASSIFYING FUNCTION
122, 722 PARTIAL AREA VOTING FUNCTION
123, 723 VOTING PEAK DETECTION FUNCTION
124, 724 OBJECT RECOGNITION FUNCTION
125, 725 RECOGNITION RESULT OUTPUT FUNCTION
130 IMAGE INPUT DEVICE
200 PARTIAL AREA SET
201 AREA WHICH IS MOST LIKELY TO BE OBJECT TO BE IDENTIFIED IN PARTIAL AREA SET 200
300 OBJECT TO BE RECOGNIZED
301 RECOGNITION REFERENCE POINT
302, 401, 801 PARTIAL AREA
303 RELATIVE POSITION
304, 402 VOTING PATTERN
305 POINT ON VOTING PATTERN CORRESPONDING TO RELATIVE POSITION
306 DISTRIBUTION OF RELATIVE POSITION
400 VOTING SPACE
403 VOTE VALUE
500 ORIGINAL IMAGE
601 PERSON
800 LEARNING IMAGE
1000 LEARNING IMAGE
1001 FEATURE POINT DETECTION UNIT
1002 FEATURE AMOUNT CALCULATION UNIT
1003 VOTE LEARNING UNIT
1004 CLASSIFIER LEARNING UNIT

The invention claimed is:

1. An image recognition system, comprising:
an image recognition unit that recognizes an object to be recognized included in an input image based on a result of determination by a classifier, the classifier determining a likelihood that an image included in an arbitrary area in the input image including the object to be recognized having an object to be identified is the object to be identified based on a feature amount regarding the area;
a partial area determination unit that determines a plurality of learning partial areas in a learning image including the object to be recognized;
a partial area set generation unit that generates a learning partial area set based on a learning partial area of the plurality of learning partial areas, the learning partial area set including the learning partial area and a plurality of peripheral areas included in a predetermined range with reference to the learning partial area; and
a learning unit that selects, when performing learning of the classifier for the learning partial area, an area including an image suitable to be determined as the object to be identified from a plurality of areas included in the learning partial area set generated by the learning partial area, to learn the classifier so as to determine a likelihood that the image included in the area comprises the object to be identified to be higher based on a feature amount related to the selected area.

2. The image recognition system according to claim 1, wherein the learning unit calculates, when the likelihood that the classifier determines the image included in the area as the object to be identified based on a feature amount regarding the area is learned to become equal to or greater than a first predetermined likelihood, a relative position of a reference point set in advance for the object to be recognized including the object to be identified from the area,
wherein the image recognition system further comprises a voting pattern generation unit that generates a voting pattern indicating distribution of the relative position calculated by the learning unit, and
wherein the image recognition unit comprises:
an identification unit that determines a plurality of input partial areas in the input image to determine by the classifier a likelihood that an image included in an input partial area of the plurality of input partial areas comprises the object to be identified based on a feature amount regarding the input partial area;
a voting unit that votes, when the likelihood that the image included in the input partial area comprises the object to be identified is equal to or greater than a second predetermined likelihood, the voting pattern to a predetermined voting space with reference to the position of the input partial area; and
an object recognition unit that recognizes the object to be recognized based on a voting result to the voting space.

3. The image recognition system according to claim 2, wherein the likelihood equal to or greater than the first predetermined likelihood comprises a highest likelihood among likelihoods determined for the plurality of respective areas included in the learning partial area set.

4. The image recognition system according to claim 2, wherein the classifier determines whether the image included in the area comprises the object to be identified,
wherein the learning unit learns the classifier to determine that the image included in the area is the object to be identified based on a feature amount related to the selected area, and calculates the relative position of the reference point from the area when the classifier is learned to determine that the image included in the area comprises the object to be identified,
wherein the identification unit determines by the classifier whether the image included in the input partial area is the object to be identified, and
wherein the voting unit performs the voting when it is determined that the image included in the input partial area is the object to be identified.

5. The image recognition system according to claim 4, wherein the object to be recognized includes a plurality of objects to be identified,
wherein the voting pattern generation unit generates a plurality of voting patterns so as to correspond to the plurality of respective objects to be identified and to indicate distribution of the relative position of the corresponding objects to be identified, and
wherein the voting unit votes the voting pattern corresponding to the object to be identified when the likelihood that the image included in the input partial area comprises the object to be identified is equal to or greater than the second predetermined likelihood.

6. The image recognition system according to claim 5, wherein the image recognition system further comprises a weight calculation unit that calculates, for each of the plurality of objects to be identified, a weight of the voting pattern corresponding to the object to be identified based on a predetermined calculation criterion, and wherein the voting unit performs voting while applying a weight corresponding to the voting pattern to the voting pattern.

7. The image recognition system according to claim 5, wherein the image recognition system comprises one classifier, and wherein the one classifier determines, for each of the plurality of objects to be identified, the likelihood that an image included in the area comprises the object to be identified based on a feature amount regarding the area.

8. The image recognition system according to claim 5, wherein the plurality of input partial areas comprises a first input partial area and a second input partial area including images of objects to be identified different from each other, and wherein, when a similarity of the first input partial area and the second input partial area becomes equal to or greater than a predetermined similarity, the classifier determines that both of the first input partial area and the second input partial area comprise the object to be identified of the image included in any one of the first input partial area and the second input partial area.

9. The image recognition system according to claim 1, wherein the learning partial area and the plurality of peripheral areas include areas in the learning image.

10. The image recognition system according to claim 1, wherein the plurality of learning partial areas includes areas in the learning image.

11. The image recognition system according to claim 1, wherein the learning unit selects the area including the image suitable to be determined as the object to be identified from the learning partial area set obtained from the learning image.

12. The image recognition system according to claim 1, wherein the learning unit learns the classifier based on the selected area.

13. An image recognition method, comprising:
determining a plurality of learning partial areas in a learning image including an object to be recognized having an object to be identified;
generating a learning partial area set based on a learning partial area of the plurality of learning partial areas, the learning partial area set including the learning partial area and a plurality of peripheral areas included in a predetermined range with reference to the learning partial area;
when performing learning of a classifier that identifies a likelihood that an image included in an arbitrary area in an input image including the object to be recognized comprises the object to be identified based on a feature amount regarding the area for the learning partial area, selecting an area including an image suitable to be determined as the object to be identified from a plurality of areas included in the learning partial area set generated by the learning partial area, to learn the identifier so as to determine a likelihood that the image included in the area is comprises the object to be identified to be higher based on a feature amount related to the selected area; and
recognizing the object to be recognized included in the input image based on a result of determining the input image by the classifier.

14. The image recognition method according to claim 13, wherein the learning partial area and the plurality of peripheral areas include areas in the learning image.

15. The image recognition method according to claim 13, wherein the plurality of learning partial areas includes areas in the learning image.

16. The image recognition method according to claim 13, wherein said selecting includes selecting the area including the image suitable to be determined as the object to be identified from the learning partial area set obtained from the learning image.

17. A non-transitory computer readable medium storing an image recognition program that causes a computer to execute the following processing of:
determining a plurality of learning partial areas in a learning image including an object to be recognized having an object to be identified;
generating a learning partial area set based on a learning partial area of the learning partial areas, the learning partial area set including the learning partial area and a plurality of peripheral areas included in a predetermined range with reference to the learning partial area;
when performing learning of a classifier that identifies a likelihood that an image included in an arbitrary area in an input image including the object to be recognized comprises the object to be identified based on a feature amount regarding the area for the learning partial area, selecting an area including an image suitable to be determined as the object to be identified from a plurality of areas included in the learning partial area set generated by the learning partial area, to learn the identifier so as to determine a likelihood that the image included in the area comprises the object to be identified to be higher based on a feature amount related to the selected area; and
recognizing the object to be recognized included in the input image based on a result of determining the input image by the classifier.

18. The non-transitory computer readable medium according to claim 17, wherein the learning partial area and the plurality of peripheral areas include areas in the learning image.

19. The non-transitory computer readable medium according to claim 17, wherein the plurality of learning partial areas includes areas in the learning image.

20. The non-transitory computer readable medium according to claim 17, wherein said selecting includes selecting the area including the image suitable to be determined as the object to be identified from the learning partial area set obtained from the learning image.

* * * * *